March 5, 1957  R. A. MELDRUM  2,783,717
SLEEPING CAR
Filed Aug. 16, 1951  13 Sheets-Sheet 5

March 5, 1957 R. A. MELDRUM 2,783,717
SLEEPING CAR
Filed Aug. 16, 1951 13 Sheets-Sheet 9

Inventor:
Robert A. Meldrum
By: Zabel & Fitzhugh
Attorneys

March 5, 1957 R. A. MELDRUM 2,783,717
SLEEPING CAR
Filed Aug. 16, 1951 13 Sheets-Sheet 12

Inventor:
Robert A. Meldrum
By: Zabel & Gritzbaugh
Attorneys

March 5, 1957 R. A. MELDRUM 2,783,717
SLEEPING CAR

Filed Aug. 16, 1951 13 Sheets-Sheet 13

Inventor:
Robert A. Meldrum
By: Zabel & Dritzbaugh
Attorneys

United States Patent Office 2,783,717
Patented Mar. 5, 1957

2,783,717

SLEEPING CAR

Robert A. Meldrum, Chicago, Ill., assignor to Pullman-Standard Car Manufacturing Company, Chicago, Ill., a corporation of Delaware Application August 16, 1951, Serial No. 242,063

13 Claims. (Cl. 105—317)

This invention relates to improvements in sleeping cars, and in particular to an improved berth arrangement and to improved means for installing the same.

One of the objects of the present invention is to provide a berth assembly in the form of a unit which is structurally independent of adjacent berth assemblies and which can be installed in a passenger car of standard construction with little or no modification of the car structure.

More specifically it is contemplated that the present invention be utilized in converting standard day coaches into troop sleepers, hospital cars, and the like. For the purpose of such conversion, the berth assemblies can be manufactured as separate and independent units in advance of installation. The actual installation can be made at any convenient time and place.

A further object of this invention is to provide a three tier berth arrangement in which the top berth is permanently located, and the middle berth is slidable from an occupancy or use position upwardly to an inoperative or storage position. In the case of a hospital car, more headroom is thereby provided for the bottom berth which permits attendance of the bottom berth patient by a physician or permits the use of traction apparatus or the like. In the case of a troop sleeper, the additional headroom permits the use of a bottom berth which is convertible to seats for daytime use.

Another object is to provide an improved counterbalanced and vertical sliding mounting means for a berth.

A further object is to provide a novel and separable cooperation between a two berth assembly and the wall of a car in which the counterbalancing means is concealed.

Still another object is to provide an improved two berth arrangement in which the aisle side of the two berths are suspended from the ceiling by telescopic supporting means to the end that when the lower of the two berths is moved upwardly, the space underneath the said lower berth is free from supporting means.

A still further object is to provide an improved convertible seat construction by means of which a pair of such seats may be converted to a berth. In this connection, I have provided a construction in which the seat bottom and back cushions are movable from a normal seating position above a supporting frame to a berth position in which both cushions are cantilevered out, in opposite directions, beyond the supporting frame. Other objects are to provide improved means for supporting the cushion elements in said cantilevered position, and improved means for locking them in their normal and cantilevered positions.

Other objects, features and advantages will become apparent as the description proceeds.

With reference now to the drawings, in which like reference numerals designate like parts.

Figure 1:
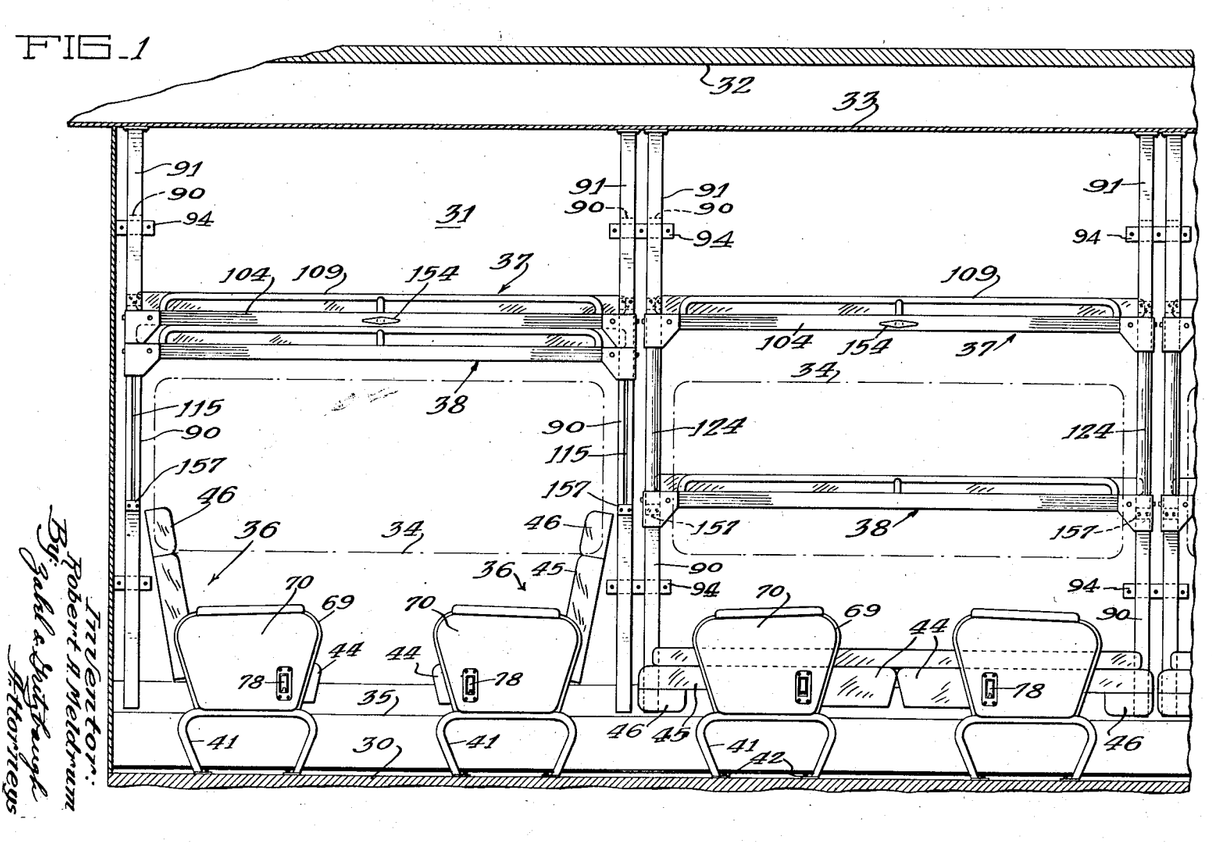
Fig. 1 is a central longitudinal section through a portion of a sleeping car embodying the invention, showing two sections in elevation, one being in day position and one in night position.
Figure 2:
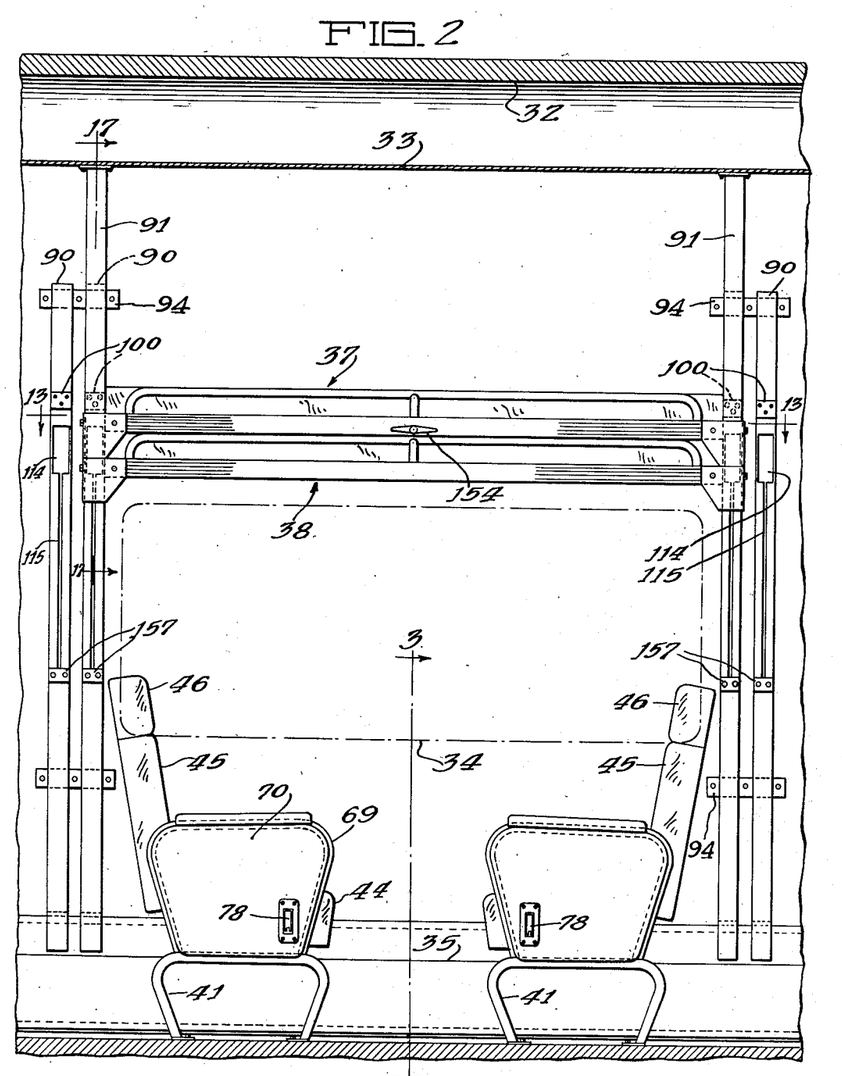
Fig. 2 is a view similar to Fig. 1 showing a single section enlarged, and also showing the stanchions of adjacent sections prior to installation of the berths.
Figures 20, 21, 22, 23:
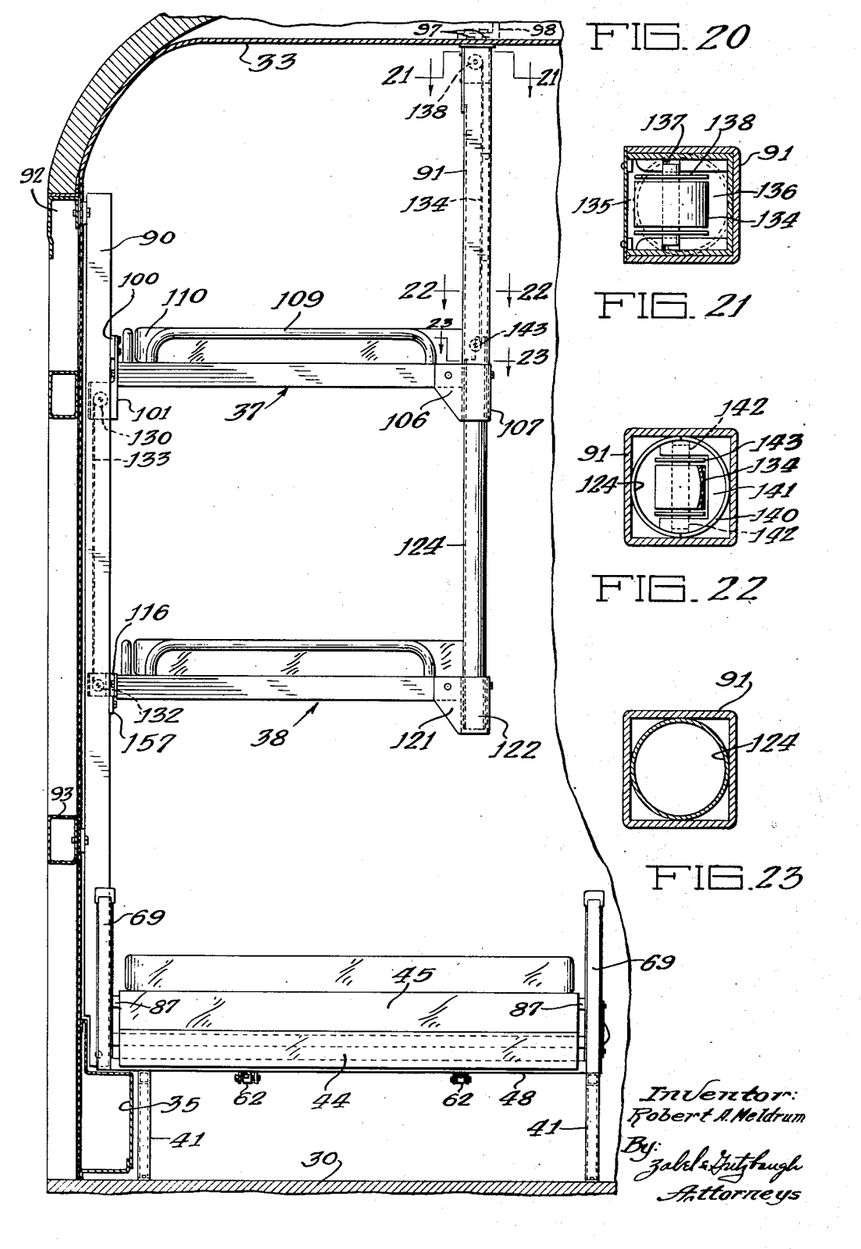
Fig. 20 is a vertical section view through the entire section showing the same in night position.
Fig. 21 is a horizontal section taken along line 21—21 of Fig. 20.
Fig. 22 is a horizontal section taken along line 22—22 of Fig. 20.
Fig. 23 is a horizontal section taken along line 23—23 of Fig. 20.

Figs. 1, 2 and 20 show a portion of a railway car having an under frame providing a floor 30, suitable structural members providing a side wall 31, and a roof structure 32 which includes a ceiling 33. The car is provided with the usual windows 34. Beneath the windows there is a duct 35 to accommodate steam pipes or hot air. An aisle divides the car into two halves, and each half is divided into occupancy spaces or sections, two of which sections are shown in Fig. 1. Each section includes a pair of oppositely facing convertible seats 36, a top berth 37, and a middle berth 38. The seats are adapted to be converted to provide a bottom berth, as shown in the right hand portion of Fig. 1. Thus each section provides three berths when in night position.

*Seat construction*

Figure 5:
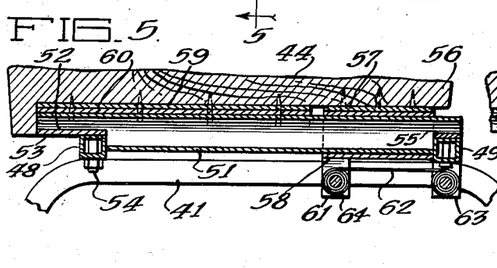
Fig. 5 is a vertical section taken along line 5—5 of Fig. 4.
Figure 6:
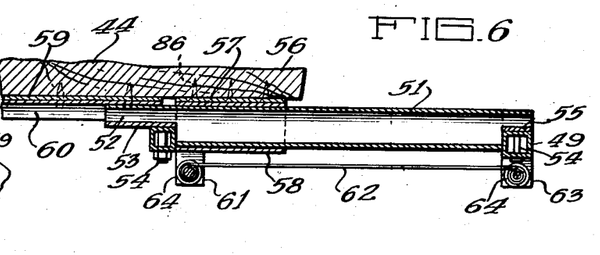
Fig. 6 is a view similar to Fig. 5, but showing the parts in a changed position.
Figures 7, 8, 9:
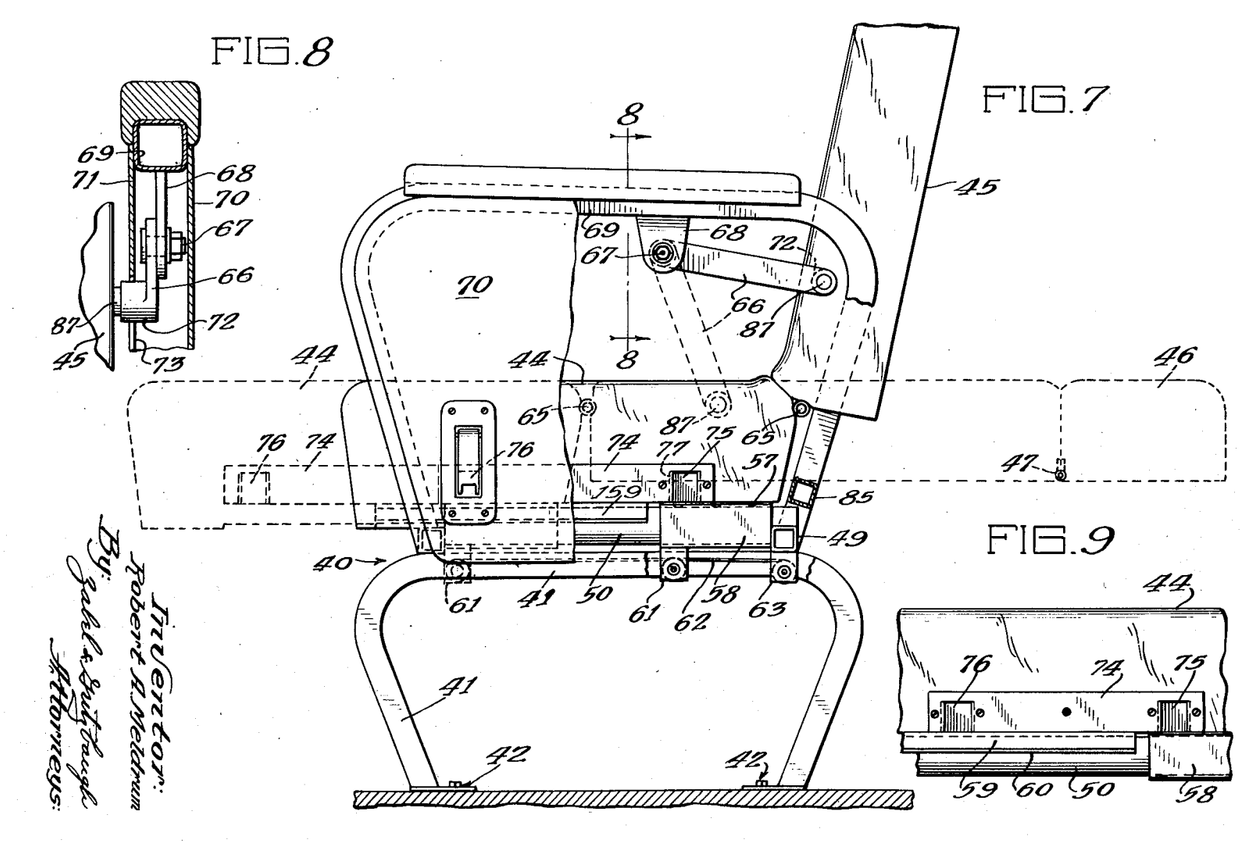
Fig. 7 is a side view, partially broken away, of the seat shown in Fig. 3, showing a changed position in broken lines.
Fig. 8 is a vertical section taken along line 8—8 of Fig. 7 showing the link connecting the seat back to the arm rest.
Fig. 9 is a fragmentary elevation showing the recessed plate mounted on the seat bottom cushion.

The seat construction is shown in Figs. 3 to 12. Each seat is structurally independent of any other seat and of the top and middle berths. As shown in Fig. 7, the seat comprises a frame assembly 40 which is supported by a pair of inverted U-shaped legs 41, which may be tubular members of square cross section. The legs are secured to the floor by suitable bolts as indicated by the reference numerals 42. Each seat also includes the seat end structures 69—70—71, a bottom cushion 44 and a back cushion 45. A headrest 46 is hinged to the back cushion 45 by beans of a hinge 47. Suitable means, not shown, may be provided for locking the headrest in upright position as shown in Fig. 2.

Figure 3:
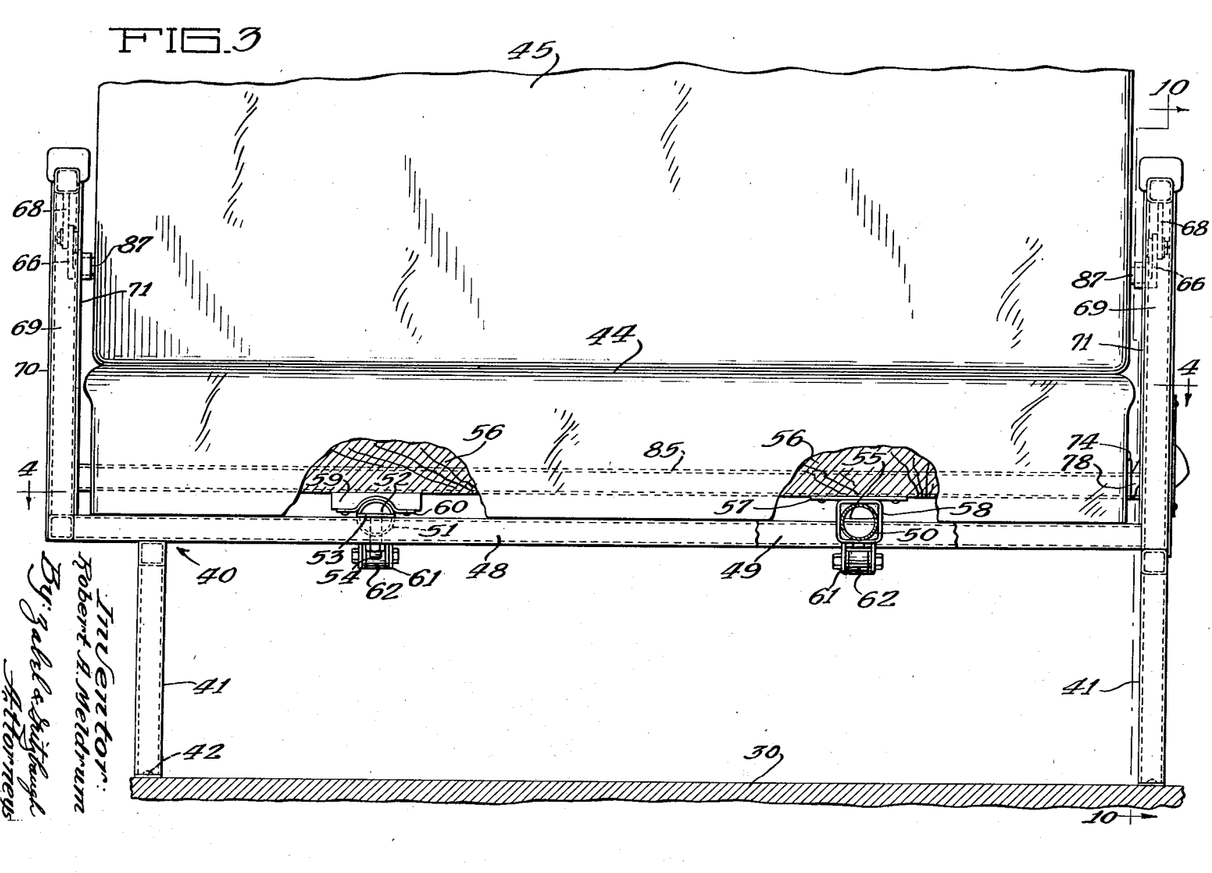
Fig. 3 is an enlarged front view of the seat, partially broken away, taken along line 3—3 of Fig. 2.
Figure 4:
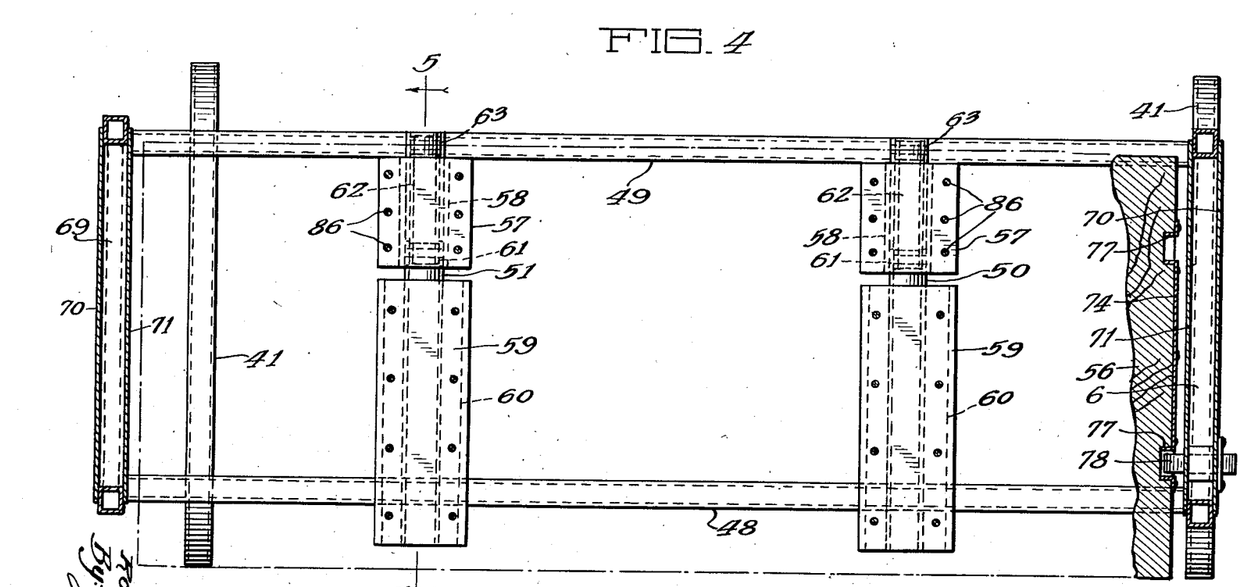
Fig. 4 is a horizontal plan section taken along line 4—4 of Fig. 3 showing the framework of the seat in plan.

The frame assembly 40 comprises transverse members 48 and 49 which are suitably secured to the legs 41. Tubular longitudinal members of circular cross section connect the transverse members and serve as rails 50 and 51 on which the bottom cushion 44 is slidably mounted. Figs. 3, 5 and 6 indicate that the lower half of the front end of each of the rails 50 and 51 is cut away to provide a half round shown by the reference numeral 52. A bearing plate 53 is suitably secured, as by welding, to the cut-away portion 52 which serves to reinforce the extended portion of these rails 50 and 51.

The back ends of these rails are similarly cut away and provided with bearing plates 55 so as to fit over the transverse member 49.

Studs 54 are welded or otherwise secured to the bearing plates 53 and 55 and pass through the transverse members 48 and 49 so that the tubular rails can be secured to the transverse members 48 and 49.

The bottom surface of the seat cushion, which may be in the form of a wooden framework 56, has secured thereto a pair of plates 57 on which are mounted, as by welding or the like, short sections of square tubing forming spaced sleeves 58. These sleeves 58 surround the tubular rails 50, 51, and are adapted to provide bearing surfaces for the sliding movement of the bottom cushion with respect to the tubular rails.

The plates 57 and sleeves 58 are initially assembled with and form a part of the frame assembly 40. The bottom cushion 44 is later secured to the plates 57 by screws 86.

As shown in Figs. 3 and 5, blocks 59 are also secured to a wooden framework 56 of the seat cushion, and a wear plate 60 having a groove complementary to the curvature of the tubular connecting member, is mounted on each block, thus providing a bearing surface for the sliding movement of the seat cushion on the rails 50 and 51.

In operation, the bottom cushion 44 can be slid from the day position shown in solid lines in Fig. 7 to the night position, shown in dotted lines. The cooperation of the square sleeves 58 with the round rails 50, 51 provides a very satisfactory bearing surface, and permits the cantilevering of the seat cushion in its night position, as shown in Fig. 7.

A U-shaped bracket 61 depends from one of the sleeves 58, and includes a suitable cross member to which one end of a spring 62 may be attached. A similar bracket 63 is secured to and depends from the transverse member 49, and includes a cross member on which the other end of the spring 62 is wound. This spring serves as a counterbalance to assist in the return of the seat cushions from the night position to the day position. The cross members may be in the form of rotatably mounted spools 64, if desired. This counter-balancing spring arrangement can be duplicated, if desired, on the other rail, as shown in Fig. 3.

The back cushion 45 is secured to the bottom cushion 44 by means of a hinge 65. A link 66 extends from the back cushion 45 to an ear 68 to which it is pivotally secured by means of a pivot pin 67. The ear 68 depends from a U-shaped frame 69 which forms a portion of the seat end, as shown in Figs. 7 and 8. Thus, when the seat is in day position, the back cushion 45 is supported in its substantially upright position by means of the link 66.

Figure 10:
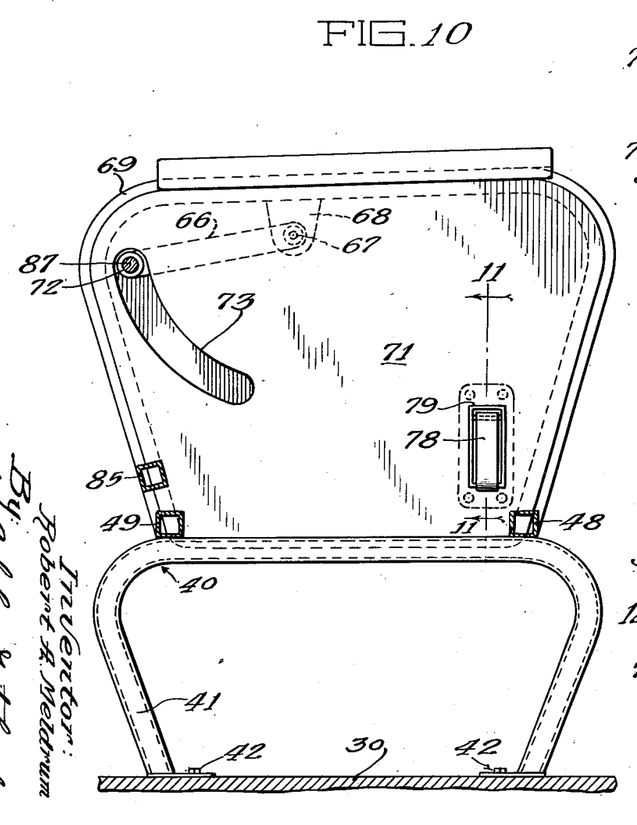
Fig. 10 is a vertical section taken along line 10—10 of Fig. 3.

A pair of protective plates 70 and 71 are suitably secured to the opposite sides of the U-frame 69 so as to form an enclosed space in which the link 66 is disposed. The outer end of the link 66 terminates in a socket 72 which projects through an arcuate slot 73 formed on the inner protective plate 71, as shown in Figs. 8 and 10. A pin 87, projecting from the back cushion, is received within socket 72. Thus, the link 66 is almost entirely enclosed, to prevent possible injury to the seat occupant.

In operation, as the seat cushion 44 is slid forwardly into night position, the link 66 serves as a guide to swing the back cushion 45 downwardly into the horizontal position shown in dotted lines in Fig. 7. In this position, the back cushion 45 rests upon a transverse bar 85 which connects the two U-shaped frames 69. The link 66 serves as a strut to maintain the back cushion in cantilevered position, wherein it projects beyond said transverse bar 85. The link 66 and the U-shaped frame 69, and their associated parts are provided in duplicate, one for each seat end, as shown in Fig. 3.

Figures 11, 12:
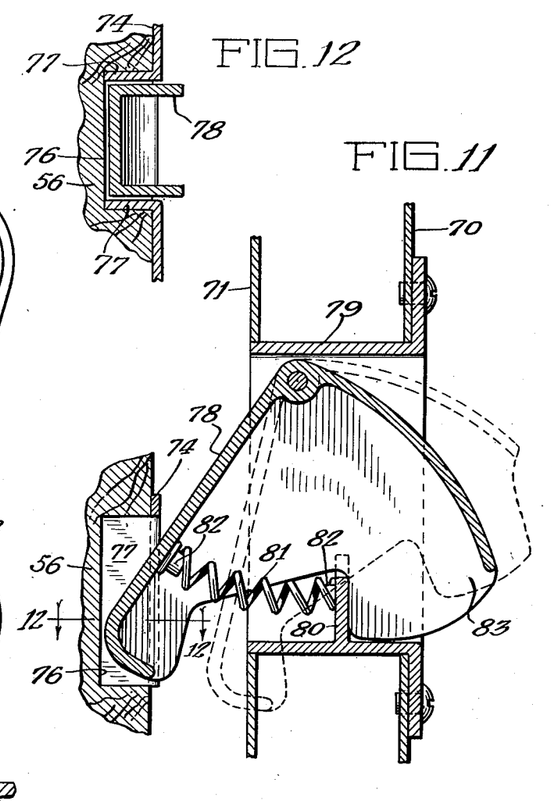
Fig. 11 is a vertical transverse section taken along line 11—11 of Fig. 10 showing the detent in enlarged detail.
Fig. 12 is a detailed section taken along line 12—12 of Fig. 11.

Means are provided for locking the cushions 44 and 45 either in the day position or in the night position. Such locking means include a plate 74 disposed at the end of the bottom cushion 44 on the aisle side. This plate as shown in Fig. 9, is provided with two openings, 75 and 76. As shown in Fig. 12, the openings are formed by inturned flanges 77. A detent 78 is provided to engage one or the other of these openings so as to maintain the cushions in their day position or night position. This detent 78, as shown in Fig. 11, is in the form of a casting which is pivotally mounted in a box shaped housing 79 which is secured by suitable flanges to the outer protective plate 70. The plates 70 and 71 are provided with registering openings which correspond to the rectangular shape of the housing 79. A partition 80 projects upwardly from the bottom of the housing 79, and a spring 81 is confined between the detent and the partition. Locating lugs 82 are provided on the detent 78 and on the partition 80 to maintain the spring 81 in place. The detent includes a finger piece 83 which projects outwardly beyond the housing 79 so that the detent may be operated.

When the cushions are in day position, the detent engages opening 76 and takes up any forward thrust exerted by the back cushion. In order to convert to night position, the detent 78 is pulled outwardly, which then permits the bottom cushion to be slid forwardly, and this movement is continued until the detent snaps into the aperture or opening 75, thereby locking the cushions in their night position.

As will be observed from the right hand portion of Fig. 1, a mattress is provided to overlie the cushions in their night position. Also, the headrests 46 are folded downwardly so as not to interfere with the bottom berth of the adjacent section.

Top berth

The top berth 37 is supported by stanchions 90 and hangers 91, both being tubular members of square cross section. The stanchions 90 are secured to the side wall 31 by means of upper and lower plates 94 to which the stanchions are welded or otherwise secured. The upper plate 94 is bolted or riveted to an upper longitudinally disposed wall member 92, as shown in Fig. 20. The lower plate 94 is similarly secured to belt rail 93. Fig. 2 shows the stanchions of adjacent sections prior to the installation of the berths.

The hangers 91 are welded or otherwise secured at their top ends to a plate 96 so that the hangers may be fastened to the ceiling 33. As shown in Fig. 20, bolts 97 pass through the plate 96, and through the ceiling 33 and take into a structural member 98, such as a duct reinforcing member, which is disposed above the ceiling.

Figure 24:
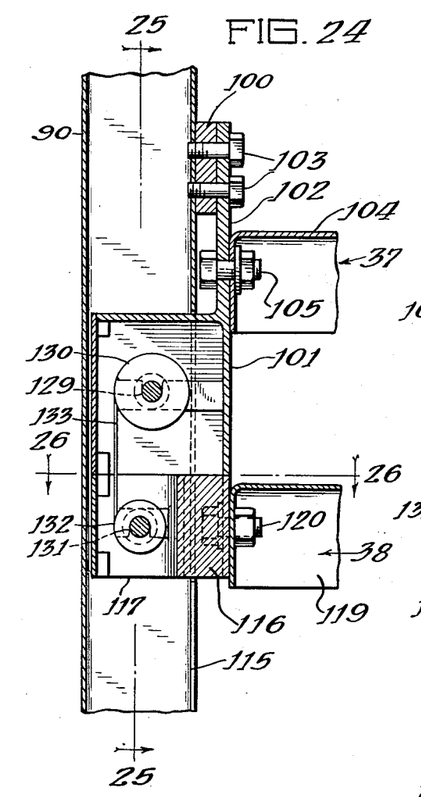
Fig. 24 is an enlarged vertical sectional view through the stanchion showing the wall side counterbalancing spring assembly and the manner of mounting same.
Figure 25:
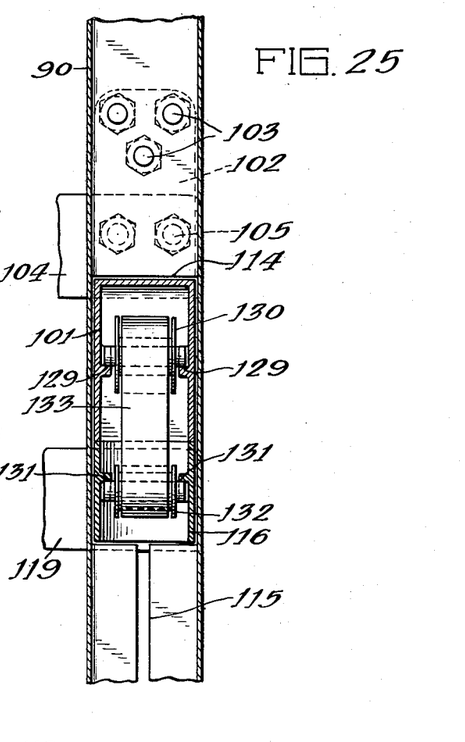
Fig. 25 is a vertical sectional view taken along line 25—25 of Fig. 24.

The manner in which the top berth 37 is secured at its wall side to stanchions 90 is shown in detail in Fig. 24. It will be observed that a tapped block 100 is welded to the stanchions 90 which permits an element, referred to as the spring retainer housing 101, to be mounted on the stanchion. The spring retainer housing has a bracket portion 102 through which bolts 103 pass, the bolts being screw threaded into the tapped block 100 so that the spring retainer housing can be firmly secured with respect to the stanchion.

The frame 104 of the top berth 37 is suitably bolted by means of nut and bolt 105 to the bracket portion 102. This is done prior to installation so that the spring retainer housing thus forms a part of the berth assembly. Then during installation the whole berth assembly is secured to the stanchion by means of bolts 103.

Figure 13:
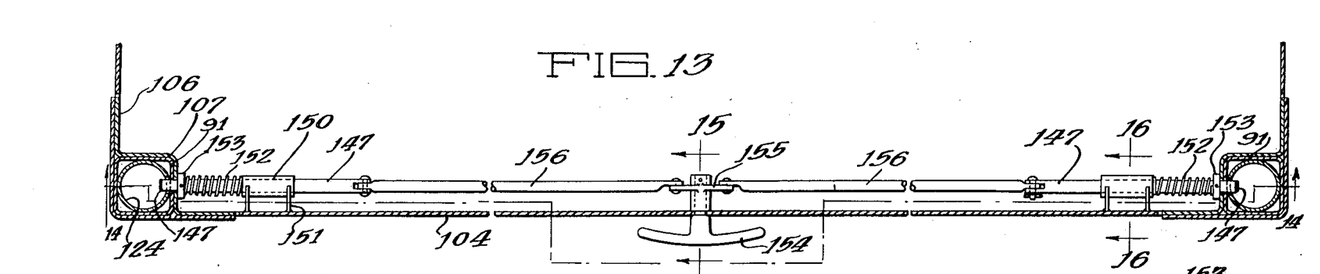
Fig. 13 is a horizontal section taken along line 13—13 of Fig. 2 showing the berth locking means.
Figures 13A, 14, 15, 16:
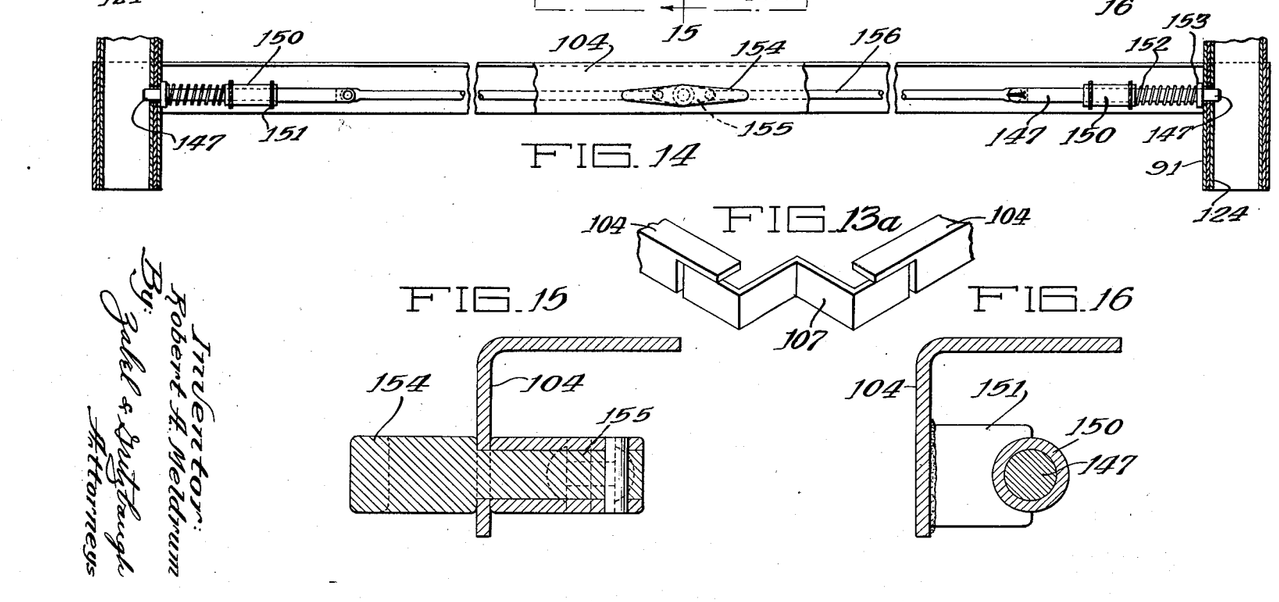
Fig. 13a is an isometric view of a connecting member.
Fig. 14 is a vertical section taken along line 14—14 of Fig. 13.
Fig. 15 is a vertical section taken along line 15—15 of Fig. 13 showing the locking handle.
Fig. 16 is a vertical section taken along line 16—16 of Fig. 13.

The berth frame 104 includes brackets 106 at the two aisle corners. A hanger 91 is suitably welded to each bracket. The corner construction also includes a W-shaped member 107 which is welded to and connects the angle iron frame members as shown in Figs. 13 and 13a. The hanger 91 is assembled to the frame by bolting the brackets 106 to the connecting members 107. Thus, the two aisle-side corners of the top berth are secured to the hanger 91 by means of the brackets 106, and the two wall-side corners are secured to the stanchions 90 by means of the bracket portion 102, to provide a permanently located top berth.

The top berth includes the usual side and end rails 109 and a mattress 110.

Middle berth

The middle berth 38 is slidably mounted with respect to the stanchions 90 and hangers 91, and the arrangement includes counterbalancing springs to facilitate the movement of the middle berth from its occupancy position to its inoperative position.

Figure 26:
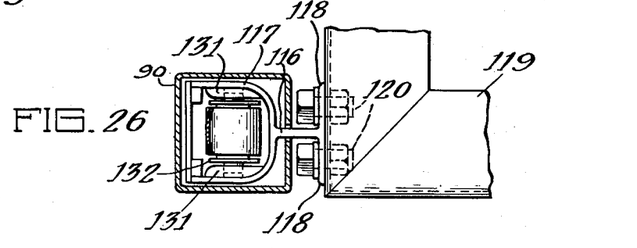
Fig. 26 is a horizontal section taken along line 26—26 of Fig. 24.

In Fig. 24 it will be observed that the spring retainer housing 101 fits into an opening 114 which is formed in the stanchion 90. Immediately beneath the opening 114 there is a slot 115 which receives the center plate 116 of a yoke assembly 117. As shown in Fig. 26 the yoke assembly also includes a flange plate 118 which is bolted to the frame 119 of middle berth 38 by means of bolts and nuts 120. Since the yoke assembly is slidable in the slot 115, the middle berth 38 is adapted for vertical sliding movement.

The aisle-side corner construction of the frame 119 of the middle berth is similar to that of the top berth. It includes brackets 121 to each of which is welded a short square tubular section 123 which matches with the square tubular member 91. The brackets 121 are bolted to a W-shaped connecting member 122.

A circular tubular member 124 of substantial length is telescopically received within the hanger 91. At its lower end member 124 is received within the square tubular section 123 and welded thereto. The brackets 121 therefore serve as a means for connecting the members 124 to the berth frame 119. Thus the aisle-side of the berth 38 is also mounted for vertical sliding movement from the Fig. 17 position to the Fig. 20 position and vice versa by means of the telescopic members 91 and 124.

A separate counterbalancing mechanism is provided for each one of the four corners of the berth 38. The spring retainer housing 101 is a box shaped structure having an open bottom which is received within the stanchion 90 as above indicated. Each of the inner surfaces of the two side walls of this spring retainer unit have a built-up portion of greater thickness which permits the formation of sockets 129 in which a spool 130 may be mounted. The spool 130 is mounted for free rotation, and the sockets 129 provide suitable bearing surfaces for the extended axle of the spool.

The yoke assembly 117 is similarly provided with a pair of sockets 131 in which a spool 132 is mounted for free rotation. A counterbalancing spring 133 extends between the spools 130 and 132.

Figures 17, 18, 19:
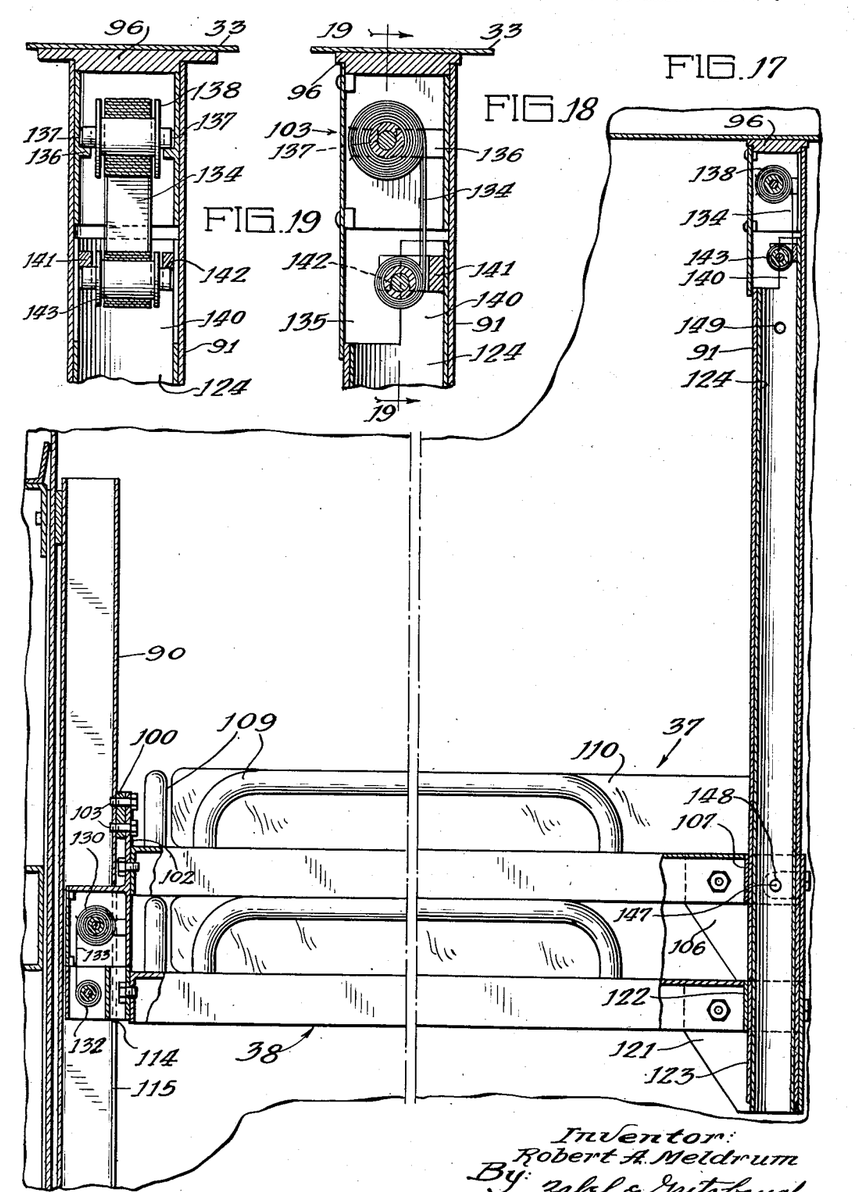
Fig. 17 is a vertical section taken along line 17—17 of Fig. 2 showing the manner in which the berth assembly is mounted.
Fig. 18 is an enlarged fragmentary view of the aisle side counterbalancing spring assembly.
Fig. 19 is a vertical section taken along line 19—19 of Fig. 18.

A somewhat similar counterbalancing arrangement is provided for the aisle side of the middle berth 38 with the exception that the counterbalancing spring 134 is located at a higher level, as shown in Fig. 17. In this instance, the upper end of the hanger 91 is provided with an opening 135 in order to receive a spring retainer unit 136 which is suitably welded in place. This spring retainer unit is likewise provided with sockets 137 in which a spool 138 is journalled.

The upper portion of the circular tubular member 124 is cut away to provide a half round extended portion 140 which is shown in Figs. 18 and 19. A U-shaped member 141, shown in Fig. 22, is suitably secured in the extended portion 140 and provides sockets 142 in which a spool 143 is rotatably journalled. The counterbalancing spring 134 extends between spools 138 and 143.

It is understood that, as shown in Fig. 2, the aisle side of the top berth is supported from two hangers 91, one at each corner, and the middle berth 38 is likewise supported at each corner by two circular tubular members 124 which are telescopically received within the hangers 91. A counterbalancing spring 134 and its associated parts, just described, is provided for each pair of the telescopic members 91 and 124 which are required for each section. Similarly, a counterbalancing spring 133 and its associated parts are provided for each one of the two stanchions required for each section. Thus, the movement of each middle berth is counterbalanced by four counterbalancing springs.

These counterbalancing springs are of a type known as a "negative spring" which is characterized by a tendency to assume a tightly coiled position. When straightened out, the strip assumes a transverse buckle, as shown in Fig. 22, and this is the tensioned or deflected position of the "negative spring." One of the characteristics of this type of spring is the fact that it can be made so as to exert a substantially constant force irrespective of the extent of deflection. This characteristic permits it to be used as a counterbalancing element in the particular construction shown herein.

This type of spring is identified in greater detail in the July 1949 issue of "Product Engineering." The present invention contemplates the use of this negative spring in combination with a telescopic member for the reason that the unwound portion of the spring projects away from the wound portion in a straight line. Thus, the spring can be mounted within a tubular element for the reason that it will not react against or scrape against the interior of the tubular element as would the usual type of spiral spring. Furthermore, due to its compactness the spring can be mounted directly within a tubular element.

Although in the construction shown, the spring is mounted on two spools, one carried by each member of the telescoped pair, it is obvious that the wound portion, if it is desired, can occupy just one spool, the free end being suitably secured to the other telescoped member.

As an alternative construction, the spools can be omitted if the normal radius of the spring, in its relaxed position, is greater than the radius of the cross member on which it is mounted. Thus the wound spring will rotate freely on the cross member.

It is contemplated that this type of spring be also used in the seat construction, as indicated by the reference numeral 62 in Fig. 6.

Figure 29:
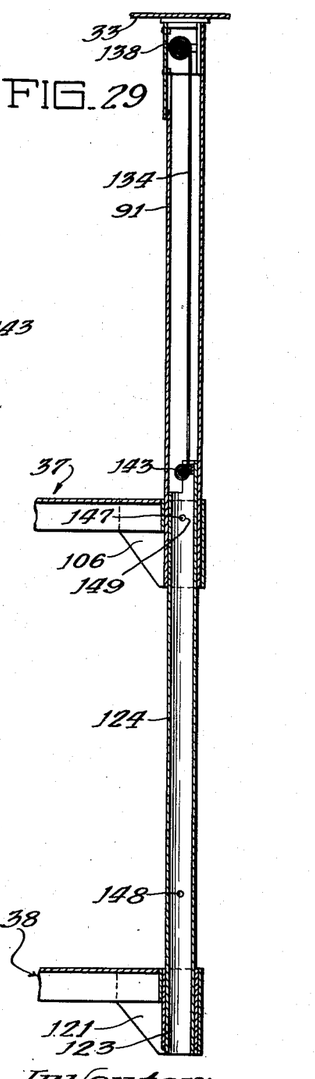
Fig. 29 is a vertical section taken along line 29—29 of Fig. 27.
Figure 30:
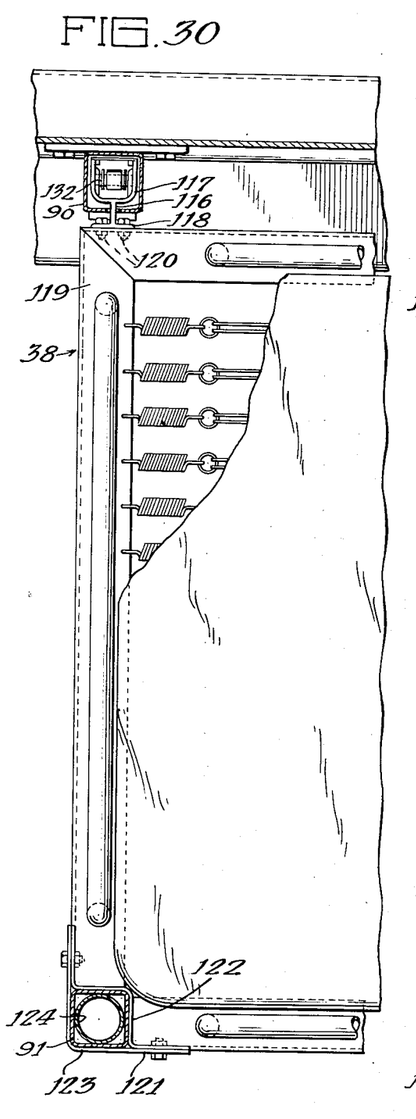
Fig. 30 is a horizontal section taken along line 30—30 of Fig. 28.

Means shown in Figs. 13 and 16 are provided to lock the middle berth 38 in either its upper, or storage position or in its lower, or occupancy position. Such means include a pair of locking pins 147 which pass through the hangers 91 and project into apertures formed in the circular tubular members 124. Each tubular member 124 is provided with a lower aperture 148 and an upper aperture 149, as shown in Figs. 17 and 29. The locking pin for each pair of telescopic members can be located in the frame 104 of the top berth 37. The locking pin is slidably mounted in a sleeve 150 which is spaced from the aisle side portion of the bed frame 104 by means of lugs 151. A spring 152 is confined between the sleeve and a collar 153 so as to urge the locking pin into locking position. It will be observed that two such locking pins are provided for each section and they are retracted by a common control which includes a handle 154. The handle is suitably journalled in a depending flange portion of the frame 104, and at its inner end, the handle is provided with oppositely disposed arms 155 which are suitably connected to links 156, the links in turn being pivotally connected to the ends of the locking pins 147. Thus, when the berth 38 is in its upper or inoperative position, the locking pins project through the sleeves 107 of the brackets 106 and also through the hangers 91 into the lower aperture 148. To lower the berth, the handle 154 is turned so as to retract both locking pins simultaneously, and the berth 38 is then pulled downwardly until the locking pins snap into the apertures 149. Thus, the aisle side of the berth, when in occupancy position, is supported from the ceiling by the telescopic members 91 and 124. In this position, the wall side of the berth is supported by plates 157 which are suitably secured to the stanchions 90 at the bottom of slots 115. The yoke assemblies 117, and in particular, the center plates 116 rest on the plates 157.

*Operation*

The operation of the various elements and sub-assemblies have been pointed out in detail in the description of those parts.

One of the chief advantages of the present berth arrangement is that it can be utilized in the conversion of a standard day coach into a troop sleeper. Each berth assembly fits in the space formerly occupied by a window and two ordinary day coach seats. To convert such a day coach to a troop sleeper, the day coach seats are first removed.

Then the stanchions 90 are secured to the walls between the windows. For the purpose of convenience of installation, two stanchions may be associated with each other by the plates 94, each unit including one stanchion of the adjacent pairs, the term "pair" as herein used referring to the two stanchions which are associated with a single section or occupancy space.

The top and middle berth are assembled together at the time of manufacture, to form a two berth assembly which includes the telescopic members 91 and 124, the spring retainer housings 101, the yoke assemblies 117, and the counterbalancing springs 133 and 134. Thus, all that needs to be done at the place of installation is to bolt the berth assembly first to the stanchions, and then to the ceiling. In particular, the berth assembly is secured to the stanchions by the bolts 103 which secure the bracket portions 102 to the tapped blocks 100. The berth assembly is secured to the ceiling by means of bolts 120 which are threaded into the ceiling at a point where the ceiling is backed by a reinforcing member.

In installing the seats, the seat bottom cushion 44 is first secured to the frame assembly 40 by means of suitable screws 86 which pass through plate 57 and are screwed into the framework 56 of the seat bottom. At this time, the pins 87 of the seat back are fitted into the sockets 62 of the links 66. Then the fully assembled seat is secured to the floor by bolts 42.

Thus, it will be seen that in converting a day coach to a troop sleeper no structural modification of the car is required. Furthermore, each section is structurally independent of every other section. Also, the seats are structurally independent of each other and of the berth assemblies.

In those instances when it is desired to install the present berth arrangement in the car at the time it is built, the stanchions 90, or equivalent means, may be built into the car wall, to present a more attractive appearance.

As indicated previously, the middle berth is moved from storage to occupancy position by turning the handle 154 which releases the middle berth for sliding movement.

The seats are converted from day to night position by pulling out the finger piece 83 to retract the detent 78, and then sliding the seat bottom cushion forwardly until the detent again snaps into place. This brings the back cushion 45 into a horizontal position in which it rests on the transverse bar 85 and is cantilevered out beyond the same, the bottom cushion 44 being cantilevered out beyond frame 40 in the opposite direction. Thus, the two cushions 44 and 45 form a half berth which cooperates with the cushions of an adjacent seat to form a full berth. The head rest 46 is released and folded downwardly to prevent interference with the bottom berth of the adjacent section. The mattress 84 for the bottom berth can be stored, during daytime, on the top berth.

*Hospital car*

Certain aspects of the present invention lend themselves for use in a hospital car, and in particular for the conversion of a standard day coach into a hospital car.

Figure 27:
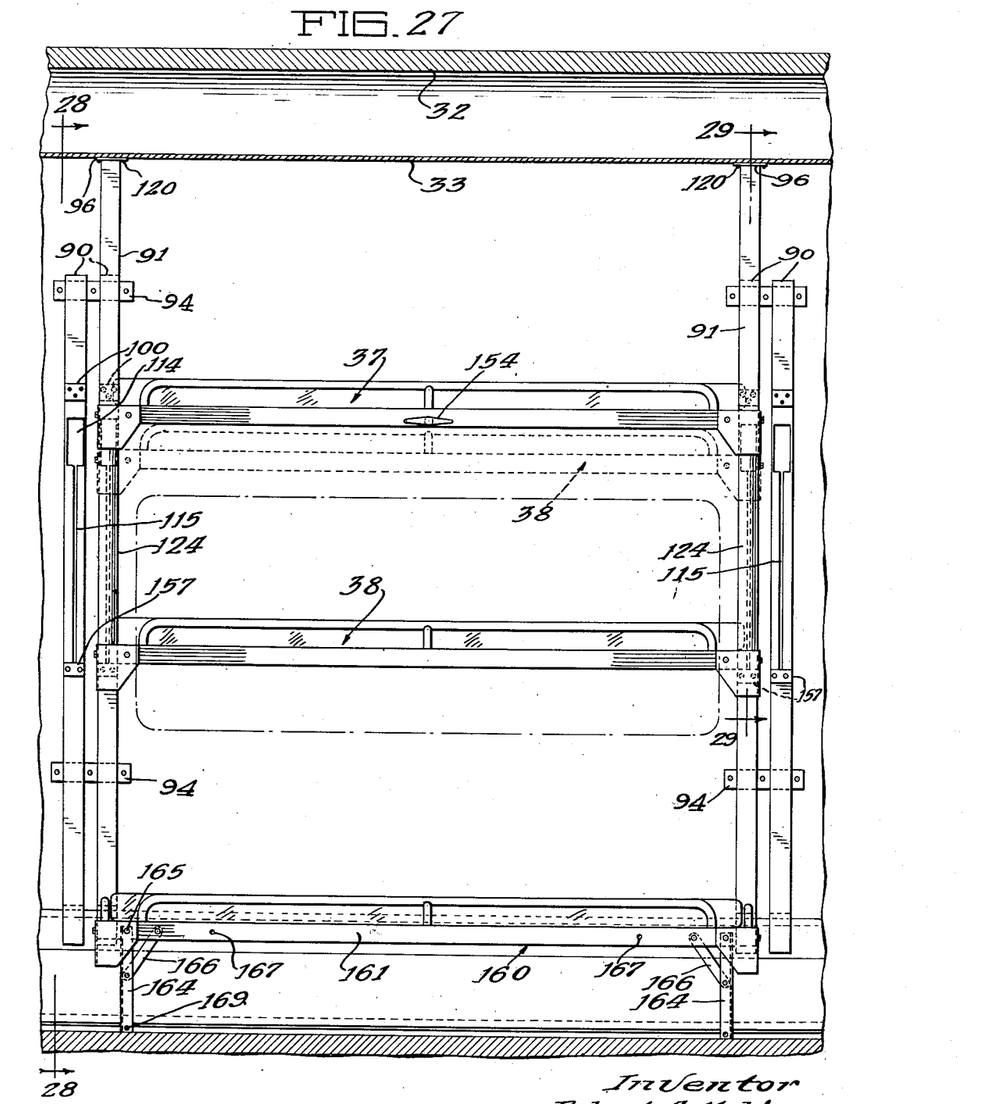
Fig. 27 is a view similar to Fig. 2 but showing the invention as applied to a hospital car.
Figure 28:
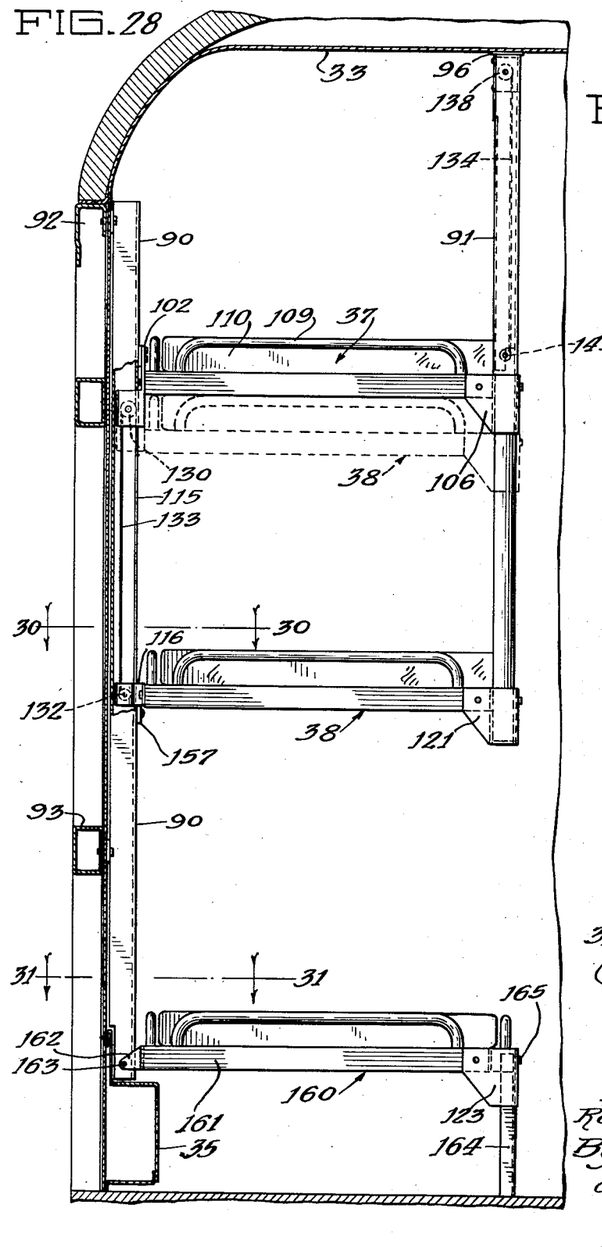
Fig. 28 is a vertical transverse section along line 28—28 of Fig. 27.
Figure 31:
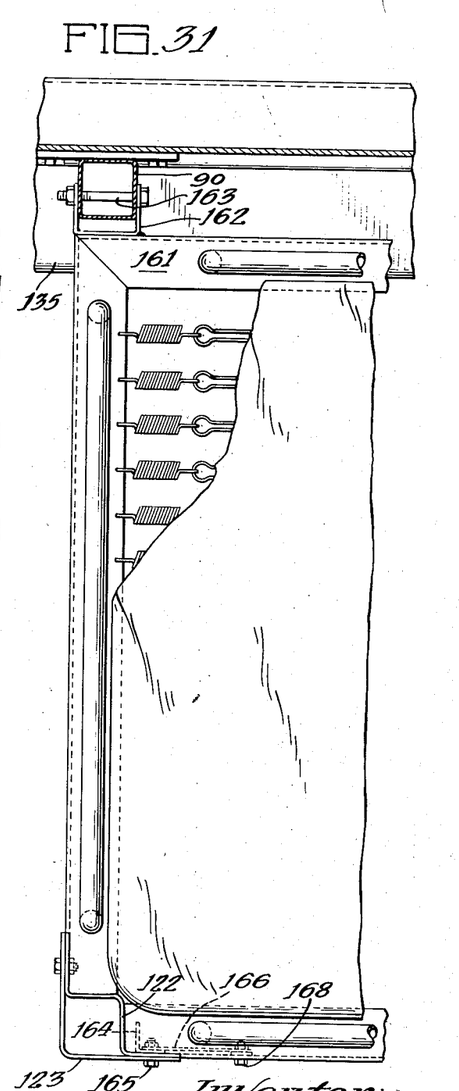
Fig. 31 is a horizontal section taken along line 31—31 of Fig. 28.

Such construction is shown in Figs. 27–31. In these figures, the two berth assembly is substantially identical to that previously described, the main difference being that instead of providing a pair of convertible seats 36, a bottom berth 160 is provided which is permanently located. As shown in Figs. 28 and 31, the bottom berth is supported at its wall side by the stanchions 90. The frame 161 of the bottom berth has secured to it a U-shaped bracket 162 which is removably secured to the stanchions 90 by means of a nut and bolt 163.

At its aisle side, the bottom berth is supported by legs 164 as shown in Figs. 27 and 28. The legs 164 which may be in the form of angle irons may be pivotally connected to the frame 161 by suitable nuts and bolts 165, and may be maintained in extended position by a strut 166. This permits the legs to be swung upwardly into horizontal position for convenience in storage, prior to installation. It will be observed that a hole 167 is provided in the frame 161 which permits the position of the upper end of the strut 166 to be shifted when the leg is brought up into this storage position. The upper end of the strut is removably secured to the frame 161 by a nut and bolt 168. A hole 169 is also formed at the end of the leg which coincides with hole 167 so that the bolt 168 can pass through all three members in order to maintain the parts in their storage position. As indicated, the remaining elements shown in Figs. 27–31 are identical to the corresponding elements shown in the preceding figures, and the same reference numerals have been applied thereto.

The slidable mounting of the middle berth 38 is particularly advantageous in a hospital car for the reason that it may be moved upwardly into storage position to provide more head room for the patient in the bottom berth. This may be necessary where the patient in the bottom berth requires special attention from the physician or where a patient requires the use of special apparatus, such as an oxygen tent or traction apparatus.

It is understood that various changes and modifications may be made in the embodiments shown and described herein without departing from the spirit of the invention as pointed out in the appended claims.

I claim:

1. In a sleeping car, a passenger accommodation comprising three superposed berths, the top berths being permanently located, the middle berth being slidably mounted for translational movement between an occupancy position wherein it is spaced beneath said top berth and a storage position in which it is immediately adjacent said top berth, and a bottom berth, said top berth being supported from the ceiling of said car at its aisle side by means of vertically disposed hollow hangers located at the aisle side corners, and said middle berth being supported beneath said top berth by means of slidable members telescopically received within said hanger members whereby the space above said bottom berth and below the middle berth is free from supporting members, and means for locking said slidable members to said hanger members in either one of two positions, corresponding to the occupancy position and the storage position of said middle berth.

2. A passenger accommodation as claimed in claim 1 in which said bottom berth is convertible into a pair of seats.

3. In a sleeping car, a passenger accommodation comprising a pair of seats, each seat comprising a supporting frame and a pair of hingedly connected cushions, one of which is slidably mounted on said frame for movement between a day position wherein said cushions form a horizontally disposed seat bottom and an upwardly extending seat back, and a night position, wherein both cushions are horizontally disposed and are cantilevered out in opposite directions beyond said supporting frame to provide a half berth which cooperates with the cushions of the other seat to form a full berth, a berth disposed above said pair of seats, and means supporting said last-mentioned berth and permitting bodily displacement of the same from a storage position downwardly into an occupancy position, said supporting means including two pairs of telescopic members connected to the aisle side of said last-mentioned berth whereby the same may be partially suspended from the ceiling so that the space above said seats and below said last-mentioned berth is free from supporting members.

4. A hospital car comprising a railway vehicle having two side walls, a ceiling, and an aisle, a plurality of structurally independent two berth assemblies disposed along one side of the vehicle between said aisle and one of said side walls, each of said assemblies providing a permanently located top berth and a middle berth mounted for bodily sliding vertical movement between an occupancy position wherein it is spaced from said top berth, and a storage position wherein it is spaced immediately adjacent and beneath said top berth, a plurality of pairs of stanchions secured to said side walls, said berth assemblies being supported at their wall sides by said stanchions, and at their aisle sides from the ceiling, and a bottom berth disposed beneath each of said two berth assemblies, each of said bottom berths being connected at its wall side to a pair of stanchions to provide support for the wall side of said berth, and being provided with legs at the aisle side to provide support for the aisle side of said berth.

5. In combination, a pair of superposed berths and a pair of telescopic members, the upper one of said berths being secured to the outer one of said telescopic members, and the lower one of said berths being secured to the inner one of said telescopic members whereby when said outer telescopic member is secured to an overhanging support, said upper berth will be permanently located, and said lower berth will be movable between an occupancy position in which it is spaced from said upper berth, and a storage position in which it is disposed immediately beneath said upper berth.

6. The combination as claimed in claim 5 including a retractable blocking pin slidably mounted on said upper berth and having a portion projecting through both of said telescopic members in order to lock said lower berth in said storage position.

7. The combination as claimed in claim 5 including a counterbalancing spring engaging and extended between the upper ends of both of said telescopic members.

8. In a two-berth assembly for installation in a vehicle having a wall structure, a portion of said wall structure being provided with two laterally spaced substantially rectangular openings and a downwardly extending slot communicating with each opening, and in which said berth assembly includes a pair of superposed berths, each having two wall-side corners, the combination of a spring retainer housing projecting from each of the wall-side corners of said upper berth and adapted to be received within the opening provided by said wall structure, a yoke assembly projecting from each of the wall-side corners of said lower berth and adapted to slide in the slot of said wall structure, the spring retainer housing and yoke assembly of superposed corners constituting a pair of spring engaging elements, and a counterbalancing spring disposed between each of said spring engaging elements, whereby after installation of said berth assembly in a vehicle so that said spring retainer housings and yoke assemblies project into said laterally spaced openings, said counterbalancing spring will be completely concealed in said wall structure.

9. A two-berth assembly for installation in a vehicle having a ceiling and a wall structure, a portion of said wall structure being provided with two laterally spaced substantially rectangular openings and a downwardly extending slot communicating with each opening, said berth assembly comprising a pair of superposed berths having two wall-side corners and two aisle-side corners, a pair of telescopic supporting members for each aisle-side corners, the outer telescopic member of each pair being secured to the upper one of said berths and the inner telescopic member being secured to the lower one of said berths, a counterbalancing spring disposed entirely within each of said telescopic pairs, a spring retainer housing projecting from each of the wall-side corners of said upper berth and adapted to be received within the openings provided by said wall structure, a yoke assembly projecting from each of the wall-side corners of said lower berth and adapted to be received within said openings when said lower berth is in a storage position immediately adjacent said upper berth, said yoke assembly including a center plate adapted to slide in the slot of said wall structure, the spring retainer housing and yoke assembly of superposed corners constituting a pair of spring engaging elements, and a counterbalancing spring disposed between each of said spring engaging elements, whereby said berth assembly may be installed in a vehicle by securing said outer telescopic members to the ceiling thereof, and by securing said upper berth to the wall structure thereof so that said spring retainer housings and yoke assemblies project into said laterally spaced openings, thereby providing a permanently located upper berth and a slidably mounted lower berth which is movable downwardly from said storage position into an occupancy position.

10. In a vehicle having a wall and a ceiling, the combination of a berth, telescopic supporting means for said berth, one end of which means is secured to said ceiling and the other end of which is secured to said berth, whereby said berth may be elevated from an occupancy position upwardly into a storage position, means on said wall for guiding said berth in its vertical movement and for limiting the movement of the same in the downward direction, whereby the space beneath said berth in its storage position is free from depending supporting members, means for locking said telescopic supporting means in an extended position for supporting said berth when in said occupancy position, and means for locking said telescopic supporting means in a telescoped position for supporting said berth when in said storage position.

11. Supporting means for a berth or the like comprising a pair of vertically disposed telescopic members, a spring engageing element carried by each of said members near adjacent ends thereof, at least one of said elements being in the form of a rotatably mounted spool, a negative spring wound on said spool and having and end portion engaging the other of said elements whereby said spring will bias said telescopic members into telescoped position, thereby counterbalancing the weight of a berth supported by one of said members.

12. In a vehicle having a berth which is bodily movable in a vertical direction from a storage position to an occupancy position, and vice-versa, telescopic means for supporting a portion of said berth comprising a square tubular member secured to the ceiling of said vehicle and depending therefrom, and a circular tubular member having one end secured to said berth and the other one slidingly received in said square tubular member, the outer diameter of said circular tubular member being substantially equal to the inner diameter of said square tubular member so that substantially tangential sliding contact is provided between said members along four surfaces disposed at 90 degrees to each other, thereby preventing rattling due to the motion of said vehicle.

13. In a vehicle having a berth which is bodily movable in a vertical direction from a storage position to an occupancy position, and vice-versa, supporting means for a portion of said berth comprising a pair of telescopic members including a tubular member, a rotatably mounted spool carried by one of said members, a negative spring having one end wound on said spool, the other end of said spring engaging the other one of said members, said spring being disposed within said tubular member and urging said members into telescoped position, said negative spring being in the form of a strip having a tendency to assume a transverse curvature when unwound from said spool thereby causing said unwound portion to be extended within said tubular member in a substantially straight line whereby said unwound portion will not react against the wall of said tubular member.

References Cited in the file of this patent
UNITED STATES PATENTS

| Number | Name | Date |
|---|---|---|
| 20,622 | Case | June 22, 1858 |
| 80,184 | Judson | July 21, 1868 |
| 244,772 | Shaw | July 26, 1881 |
| 319,711 | Hazelton | June 9, 1885 |
| 477,157 | Sneckner | June 14, 1892 |
| 2,371,482 | Tully et al. | Mar. 13, 1945 |
| 2,391,051 | Windsor | Dec. 18, 1945 |
| 2,430,577 | Lorenz | Nov. 11, 1947 |
| 2,544,980 | Brown | Mar. 13, 1951 |